US011947604B2

(12) United States Patent
Roitman et al.

(10) Patent No.: US 11,947,604 B2
(45) Date of Patent: Apr. 2, 2024

(54) RANKING OF MESSAGES IN DIALOGS USING FIXED POINT OPERATIONS

(71) Applicant: International Business Machines Corporation, Armonk, NY (US)

(72) Inventors: Haggai Roitman, Yokneam Illit (IL); Doron Cohen, Gilon (IL); Yosi Mass, Ramat Gan (IL); Shai Erera, Gilon (IL)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 16/821,071

(22) Filed: Mar. 17, 2020

(65) Prior Publication Data

US 2021/0294863 A1    Sep. 23, 2021

(51) Int. Cl.
*G06F 16/953*    (2019.01)
*G06F 16/901*    (2019.01)
*G06F 40/30*    (2020.01)
*G06Q 30/016*    (2023.01)

(52) U.S. Cl.
CPC ........ *G06F 16/953* (2019.01); *G06F 16/9024* (2019.01); *G06F 40/30* (2020.01); *G06Q 30/016* (2013.01)

(58) Field of Classification Search
CPC .... G06F 16/953; G06F 16/9024; G06F 40/30; G06Q 30/016
USPC ....................................................... 707/706
See application file for complete search history.

(56) References Cited

U.S. PATENT DOCUMENTS

| | | | | |
|---|---|---|---|---|
| 8,452,798 B2* | 5/2013 | Myaeng | .............. | G06F 16/3338 |
| | | | | 707/768 |
| 8,909,624 B2* | 12/2014 | Gannu | .............. | G06F 16/24578 |
| | | | | 707/723 |
| 8,983,970 B1* | 3/2015 | Osinga | .................... | G06F 16/93 |
| | | | | 707/748 |
| 9,336,269 B1* | 5/2016 | Smith | ............... | G06F 16/24573 |
| 9,449,105 B1* | 9/2016 | Taylor | ................. | G06F 16/9535 |
| 9,836,461 B1* | 12/2017 | Mishne | ................... | G06F 16/93 |
| 9,852,231 B1* | 12/2017 | Ravi | .................... | G06F 16/9024 |
| 10,049,163 B1* | 8/2018 | Sarmento | ........... | G06F 16/9535 |
| 10,091,140 B2 | 10/2018 | Galley et al. | | |
| 10,431,205 B2 | 10/2019 | Le et al. | | |
| 11,003,720 B1* | 5/2021 | Xia | ....................... | G06F 16/383 |
| 11,368,420 B1* | 6/2022 | Crook | .................. | G06K 9/6269 |
| 2005/0222981 A1* | 10/2005 | Lawrence | ............. | G06F 16/951 |
| 2009/0006289 A1* | 1/2009 | Jaros | ....................... | G06N 3/049 |
| | | | | 706/12 |

(Continued)

OTHER PUBLICATIONS

Chia Tee Kiah, Lattice-Based Statistical Spoken Document Retrieval, 2008, Core, All pages. (Year: 2008).*

(Continued)

Primary Examiner — Amy Ng
Assistant Examiner — Antonio J Caiado
(74) Attorney, Agent, or Firm — Caleb D. Wilkes (57) ABSTRACT

An example system includes a processor to receive a pseudo-relevance set including top results form a search engine in response to transmitting a set of concatenated messages of a dialog. The processor can execute a first fixed point operation on the pseudo-relevance set to generate weighted terms. The processor can also execute a second fixed point operation on a message graph including nodes with a heaviness based on the weighted terms.

20 Claims, 9 Drawing Sheets

(56) References Cited

U.S. PATENT DOCUMENTS

| | | | | |
|---|---|---|---|---|
| 2009/0024612 | A1* | 1/2009 | Tang | G06F 16/951 |
| | | | | 707/999.005 |
| 2009/0070326 | A1* | 3/2009 | Kraft | G06Q 10/10 |
| | | | | 707/999.005 |
| 2010/0161605 | A1* | 6/2010 | Gabrilovich | G06Q 30/02 |
| | | | | 707/E17.118 |
| 2011/0035370 | A1* | 2/2011 | Ortega | G06F 16/3322 |
| | | | | 707/E17.108 |
| 2011/0131205 | A1 | 6/2011 | Iyer et al. | |
| 2011/0270678 | A1* | 11/2011 | Drummond | G06Q 30/0251 |
| | | | | 707/765 |
| 2013/0204859 | A1* | 8/2013 | Vijaywargi | G06F 16/9535 |
| | | | | 707/E17.108 |
| 2013/0298038 | A1* | 11/2013 | Spivack | G06F 3/0484 |
| | | | | 715/753 |
| 2014/0108321 | A1* | 4/2014 | Buchanan | G06N 5/02 |
| | | | | 706/50 |
| 2015/0310115 | A1* | 10/2015 | Ryger | G06F 16/9535 |
| | | | | 707/708 |
| 2015/0363393 | A1* | 12/2015 | Williams | G06F 40/58 |
| | | | | 704/8 |
| 2017/0075999 | A1* | 3/2017 | Rautiainen | G06F 16/437 |
| 2017/0337262 | A1* | 11/2017 | Smith | G06F 16/36 |
| 2019/0325080 | A1* | 10/2019 | Natarajan | G06V 40/28 |
| 2020/0151277 | A1* | 5/2020 | Fisher | G06F 40/211 |
| 2020/0183985 | A1* | 6/2020 | Zhang | G06F 16/90332 |
| 2021/0019309 | A1* | 1/2021 | Yadav | G06F 16/2428 |
| 2021/0073293 | A1* | 3/2021 | Fenton | H04L 51/08 |
| 2021/0273894 | A1* | 9/2021 | Tian | H04L 51/42 |
| 2022/0121884 | A1* | 4/2022 | Zadeh | G06V 10/764 |

OTHER PUBLICATIONS

Hamed Zamani, Johanne R. Trippas, Jeff Dalton and Filip Radlinski (2022), "Conversational Information Seeking", : vol. xx, No. xx, pp. 1-194. DOI: 10.1561/XXXXXXXXX. All pages. (Year: 2022).*

Jiaul H. Paik et al., "A Fixed-Point Method for Weighting Terms in Verbose Informational Queries," Proceedings of the 23rd ACM International Conference on Information and Knowledge Management, Nov. 2014. 10 pages.

Karisani, Payam et al., "Probabilistic and Machine Learning-based Retrieval Approaches for Biomedical Dataset Retrieval," PMCID (2018) vol. 2018: article ID bax104; doi: 10.1093, PubMed. 12 pages.

* cited by examiner

FIG. 1

200
FIG. 2 my device doesnt charge<<CLIENT>>hi<<CLIENT>>my mc doesnt charge I had taken to authorised service center they did diagonsis and said there is some internal io cable issue and needs replacement<<CLIENT>>hi<<CLIENT>>hi<<CLIENT>>hi<<AGENT>>welcome at mic@company, spilde here<<CLIENT>>hi lucchese<<CLIENT>>how are you<<AGENT>> after lunch right now, so im doing good (:<<AGENT>>so about your issue<<CLIENT>>my mic has a hardware issue and is not able to charge<<AGENT>>did not the service center fixed you problem?<<CLIENT>>i am currently in india and they said it will take 7 days<<CLIENT>>to fix them as they have to get the parts<<CLIENT>>i am travelling back to london on friday<<CLIENT>>they identified the problem<<CLIENT>>how do i go about fixing this issue<<AGENT>>oh i see. so if you can take your computer and let it be serviced in london?<<AGENT>>i can give you contact to london service center<<AGENT>>just tell them when you will arrive and whats the issue<<CLIENT>>but the issue is i have to travel to amsterdam on Monday client visit<<AGENT>>oh i see<<CLIENT>>so i need a spare one<<AGENT>>only possibility is to contact wam to provide you spare computer<<AGENT>>yep<<AGENT>>i will find you info where to ask for a new one<<CLIENT>>please<<CLIENT>>i have taken the back up<<CLIENT>> and can run the mic hooked on to a power<<CLIENT>>so i can quickly restore<<AGENT>>ok, here is devices@company<<AGNET>>https://devices.com/devices/index.html#/<<AGENT>>you can use this page to request temporary device<<CLIENT>>okay<<CLIENT>>is itcouriered to me<<AGENT>>you cant log in there?

⒜▶ my device doesnt charge (0.2738072771711806)
my device doesnt charge (0.18497138093304774)
you can use this page to request temporary device (0.10006434509211165)
https://devices.com/devices/index.html#/ (0.08923571613157572)
ok, here is devices@company (0.0830096828191539)
my mc doest charge i had taken to authorised service center they did diagonsis and said there is some internal io cable issue and needs replacement (0.07332713469124158)
how do i go about fixing this issue (0.04210026048415806805)
to fix them as they have to get the parts (0.03649582567609)
did not the service center fixed you problem? (0.0313905014902584)
my mic has a hardware issue and is not able to charge (0.02252317340367462)
just tell them when you will arrive and whats the issue (0.015095366723392586)
but the issue is i have to travel to amsterdam on Monday client visit (0.011109657192909581)
they identified the problem (0.010743694733618962)
i can give you contact to london service center (0.009338559708596124)
oh i see. so if you can take your computer and let it be serviced in london? (0.007719858413338857)
welcome at mic@company, spilde here (0.004511080072561771)
only possibility is to contact wam to provide you spare computer (0.002452995825563934)
i am travelling back to london on Friday (0.001082473798409222)
i am currently in india and they said it will take 7 days (5.438996381702728E-4)
i have taken the back up (3.132476307600053E-4)
and can run the mic hooked on to a power (1.638683401879986E-4)
hi (0.0)
hi (0.0)
hi (0.0)
hi (0.0)
hi lucchese (0.0)
how are you (0.0)
after lunch right now, so im doing good (: (0.0)
so about your issue (0.0)
oh i see. (0.0)
so i need a spare one (0.0)
yep (0.0)
i will find you info where to ask for a new one (0.0)
please (0.0)
so i can quickly restore (0.0)
okay (0.0)
is itcouriered to me (0.0)
or something (0.0)
you cant log in there? (0.0)

RANKING OF MESSAGES IN DIALOGS USING FIXED POINT OPERATIONS

BACKGROUND

The present techniques relate to ranking messages. More specifically, the techniques relate to ranking messages in dialogs.

SUMMARY

According to an embodiment described herein, a system can include processor to receive a pseudo-relevance set comprising top results from a search engine in response to transmitting a set of concatenated messages of a dialog. The processor can also further execute a first fixed point operation on the pseudo-relevance set to generate weighted terms. The processor can also execute a second fixed point operation on a message graph comprising nodes with a heaviness based on the weighted terms.

According to another embodiment described herein, a method can include receiving, via a processor, a dialog comprising a plurality of messages. The method can further include concatenating, via the processor, the messages and sending the concatenated messages to a search engine. The method can also further include receiving, via the processor, a plurality of top results from the search engine to use as a pseudo-relevance set. The method can also include executing, via the processor, a first fixed point operation on the pseudo-relevance set to generate weighted terms. The method can also further include executing, via the processor, a second fixed point operation on a message graph comprising nodes with a heaviness based on the weighted terms to generate a final message ranking.

According to another embodiment described herein, a computer program product for ranking messages can include computer-readable storage medium having program code embodied therewith. The computer readable storage medium is not a transitory signal per se. The program code executable by a processor to cause the processor to receive a dialog comprising a plurality of messages and concatenate the messages. The program code can also cause the processor to send the concatenated messages to a search engine. The program code can also cause the processor to receive a plurality of top results from the search engine to use as a pseudo-relevance set. The program code can also cause the processor to execute a first fixed point operation on the pseudo-relevance set to generate weighted terms. The program code can also cause the processor to execute a second fixed point operation on a message graph comprising nodes with a heaviness based on the weighted terms to generate a final message ranking.

BRIEF DESCRIPTION OF THE SEVERAL VIEWS OF THE DRAWINGS

FIG. 3B illustrates an example generated set of ranked messages;

DETAILED DESCRIPTION

In a conversational search setting, a search engine may receive a whole message dialog as a query input and retrieve relevant information. As used herein, a dialog refers to a written or spoken conversational exchange between two or more people. For example, in the context of a chatbot automatically assisting a customer, the search engine may receive the dialog up to the point of confusion and return a solution to a customer's problem to resolve instances where a chatbot may become confused during dialog with a customer. As another examples, in the context of an agent assistance system, the search engine may return a recommended response for an agent assisting a customer based on dialog in a conversation between a human agent and a customer.

Some search engines may process such a query by submitting all dialog text as a single query. However, dialog-as-queries have unique characteristics. In particular, dialogs are highly verbose, having messages containing text written in natural language. In addition, dialogs are structured as a sequence of dependent messages. Each message may be expressed in the context of previous messages. Furthermore, some dialogs may contain several dozens of messages, which may make processing such dialogs as one long query for conversational search highly ineffective. For example, the dialogs may include many messages that are not relevant to the query.

Moreover, other systems for dialogs or chats may either employing supervised methods, such as, training a seq2seq model with some attention mechanism, or may be query-oblivious. For example, such systems may find some chat messages important without any sensitivity to specific information that is being searched for. In addition, verbose query processing methods may be oblivious to dialog structure and characteristics.

According to embodiments of the present disclosure, a system including a processor can receive a pseudo-relevance set including top results from a search engine in response to transmitting a set of concatenated messages of a dialog. As used herein, the term pseudo-relevance set means a top number of documents retrieved from a search engine given the dialog as a verbose query. The processor can execute a first fixed point operation on the pseudo-relevance set to generate weighted terms. As used herein, a fixed point operation refers to an iterative process in which a vector including scores associated with a number of objects is processed using some function until the values of the vector remain stable within a range of error. For example, the objects may be terms or messages including the terms. The processor can execute a second fixed point operation on a message graph including nodes with a heaviness based on the weighted terms. Thus, embodiments of the present disclosure are highly effective in finding informative messages for information retrieval purposes. In some examples, the techniques described herein may be used for compression of the original dialog. In various examples, the techniques may be used for static indexing pruning. As used herein, static index pruning refers to a method of reducing the size of an index and increasing the search performance by removing in advance certain terms and certain posting data, while retaining good enough quality of top-N results. Static refers to the fact that this pruning is done in advance, and not during the query execution. Static index pruning may be used to provide better input for document expansion. For example, previous dialogs may be filtered to only include relevant message and used to improve representation of subsequent queries. Moreover, the techniques do not rely on any labeling of input messages and are, therefore, unsupervised.

Figure 1:
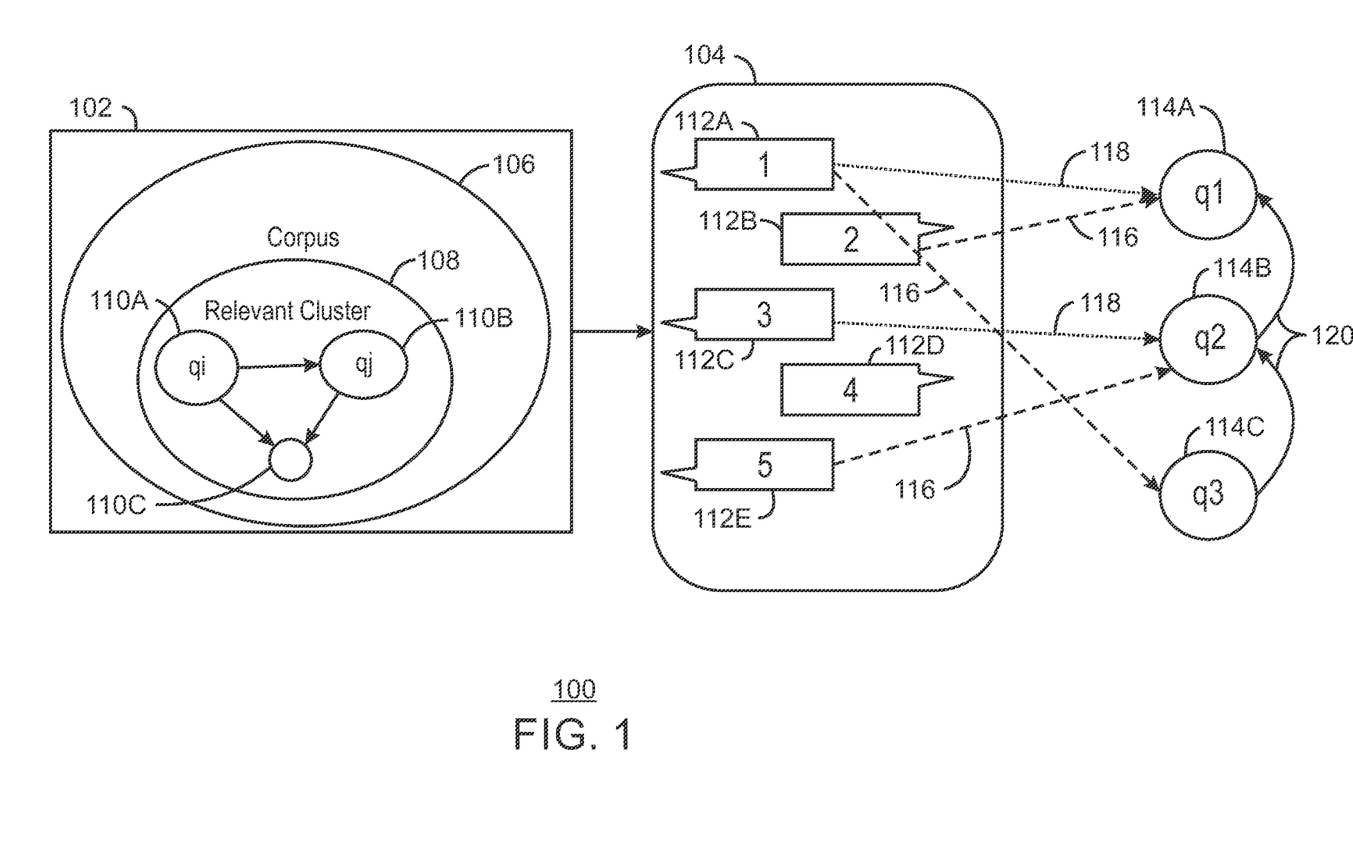
FIG. 1 is a diagram of an example temporal bias fixed point process being applied to a dialog.

With reference now to FIG. 1, a block diagram shows an example temporal bias fixed point process 100 being applied to a dialog. The temporal bias fixed point operation process 100 includes a fixed point operation 102 shown being applied to a dialog 104. For example, the dialog 104 may be a series of utterances between two or more sources of speech. The fixed point operation 102 includes a corpus 106. For example, the corpus 106 may be any suitable corpus containing solutions that are related to the dialog 104. The corpus 106 may include documents describing how to solve various problems. The corpus 106 includes a relevant cluster 108. For example, the relevant cluster 108 may include words of a pseudo-relevance set returned by a search engine. The relevant cluster 108 of documents includes terms 110A, 110B, and 110C. The relevant cluster 108 of documents may be relevant to a particular topic. For example, term $q_i$ 110A and term $q_j$ 110B are used as examples in the equations below. The dialog 104 includes messages 112A, 112B, 112C, 112D, and 112E. Although shown as coming from two speakers, with messages 112A, 112C, and 112E coming from one speaker and messages 112B and 112D coming from another speaker, the process 100 may be agnostic to the identity of the speaker of each of the messages. However, the sequence of the messages may be preserved and thus known by the process 100. The process 100 includes the generation of verbose query terms 114A, 114B, and 114C from messages 112A, 112B, 112C, 112D, and 112E. For example, the verbose query terms 114A, 114B, and 114C returned by a search engine may be words found within the messages 112A, 112B, 112C, 112D, and 112E. A first set of dashed arrows 116 and second set of dotted arrows 118 indicate messages associated with each of the verbose query terms 114A, 114B, and 114C. The dashed arrows 116 further indicate the last message that each of the terms 114A, 114B, and 114C appear in for purposes of temporal biasing.

In the example of FIG. 1, the temporal bias fixed point operation 102 may be run on all terms of the dialog 104. For example, the terms may be ranked based on importance using the temporal bias fixed point operation 102. In some examples, the dialog 104 may have been concatenated and submitted as a verbose query and the results of the verbose query may be used as a pseudo-relevance set. For example, the pseudo-relevance set may include a top predetermined number of results that are relevant to the verbose query. These top results may be used as topics. In various examples, an importance of a term can be biased based on an index of a last message that the term appears in. For example, a relative term importance can be calculated for each of the verbose query terms using the equation:

$$A(q_i) = \sum_{j \neq i} RF(q_i|q_j, Clst)A(q_j) \qquad \text{Eqn. 1}$$

where $A(q_i)$ is the relative importance of term $q_i$, $A(q_1)$ is the relative importance of term $q_j$, and $RF(q_i|q_j, Clst)$ is the frequency of term $q_i$ relative to the frequency of term $q_j$ in cluster Clst, which can be calculated using the equation:

$$RF(q_i|q_j, Clst) = \begin{cases} \frac{\log_2(1 + tf_{clst}(q_i))}{\log_2(1 + tf_{clst}(q_j))}, & tf_{clst}(q_j) > 0 \\ \log_2(1 + tf_{clst}(q_i)), & \text{else} \end{cases} \qquad \text{Eqn. 2}$$

where the term frequency counts $tf_{clst}(q_i)$ for term $q_j$ and $tf_{clst}(q_j)$ for term $q_j$ are based on the pseudo-relevance set. Thus, each term may be used to weight other terms based on the relative frequency of the term within the cluster. For example, the more frequent a term is in the cluster compared to other terms, the better and therefore more weight the term may receive. In various examples, an overall importance for each term can be calculated using the equation:

$$I(q_i) = A(q_i)\frac{idf(q_i)}{10 + idf(q_i)} \qquad \text{Eqn. 3}$$

where idf $(q_i)$ is the inverse document frequency of term $(q_j)$. Thus, the relative importance of each term may be multiplied by the inverse document frequency of the term in order to include specificity as a factor. In various examples, a temporal bias factor may then be included in order to incorporate the sequence of the messages. For example, each term may have importance adjusted relative to the last time in which the term appears in the dialog. For example, the overall importance with a temporal bias may be calculated using the equation:

$$I'(q_i) = A(q_i)\gamma^{t(q_i)} \qquad \text{Eqn. 4}$$

where $\gamma$ is a decay parameter, and $t(q_i)$ is the index of the last message containing the term $q_i$. In the example of FIG. 1, the term 114C may accordingly be penalized importance because it appears last in the first message 112A. On the other hand, the term 114B may be increased in importance via the temporal bias factor because it appears last in the last message 112E.

Still referring to FIG. 1, the result of the fixed point operation 102 may be a set of weighted terms. For example, the weights of the terms may have an incorporated temporal bias.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional corpuses, clusters, terms, messages, dialogs, speakers, etc.).

Figure 2:
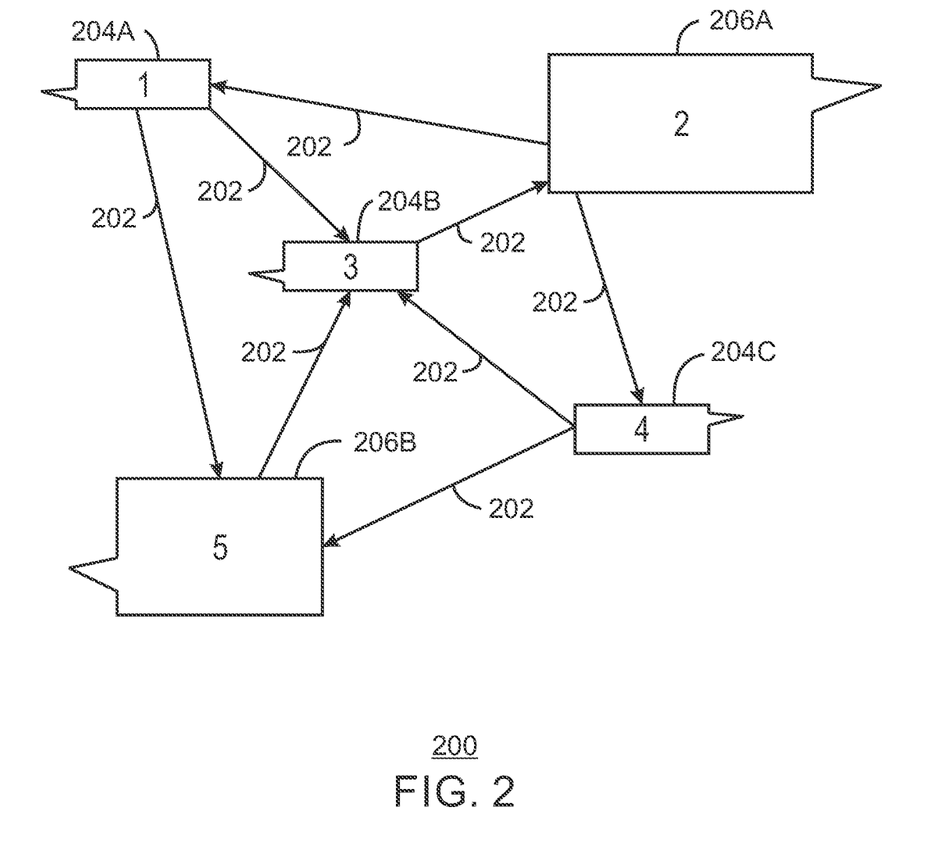
FIG. 2 is a diagram of an example fixed point operation process being applied to a message graph.

FIG. 2 is a diagram of an example fixed point operation process being applied to a message graph. The example fixed point operation process 200 may be performed using the method 400 of FIG. 4 and implemented using the computing device 500 of FIG. 5 or the computer-readable medium 800 of FIG. 8.

In the example of FIG. 2, a message graph 200 may be generated including weighted edges 202 connecting weighted messages including thin messages 204A, 204B, 204C, and heavy messages 206A and 206B. In the example message graph 200, thin messages 204A, 204B, 204C with less importance are shown using smaller dialog boxes. For example, thin messages 204A, 204B, 204C may include less highly weighted terms. Heavy messages 206A and 206B are shown using large dialog boxes to indicate more importance. For example, heavy messages 206A, and 206B may include more highly weighted terms.

In various examples, each message of the message graph 200 may be represented by the set of terms that each of the messages 204A, 204B, 204C, 206A, and 206B contains with weights generated using Eqn. 4 of FIG. 1. In some examples, the weights may be normalized by the number of entries to obtain a language model representation. For example, the weights may be normalized by dividing the summation of I(q) values. Thus, messages including terms that have higher weights may be heavier than messages including terms that have lower weights. As one example, each message may be a vector including a number for each term. The vector may include a value of 0 for a term if the message does not include the term, or a number corresponding to the normalized weight of the term if the message includes the term.

In addition, the message graph includes edges 202 with weights indicating a similarity between connected messages. For example, the similarity may be a cosine similarity. In some examples, the similarity may be based on vectors. In various examples, the cross entropy between two language models may be used to calculate the weight for an edge. For example, the weight of an edge between two messages may be calculated using the equation:

$$w(m_i, m_j) = \text{sim}_{CE}(m_i, m_j) \delta^{|i-j-1|} \quad \text{Eqn. 5}$$

where the cross entropy similarity $\text{sim}_{CE}(m_i, m_j)$ is an asymmetric similarity between message $m_i$ and message $m_j$, and $\delta^{|i-j-1|}$ is a decay function based on the relative position of the messages i and j that is independent of the content that the messages contain. In particular, if two probability distributions corresponding to the language models are well aligned, then the cross entropy similarity $\text{sim}_{CE}(m_i, m_j)$ may be lower.

In various examples, a second fixed point operation may be executed on the message graph to obtain message weights. In some examples, a power method may be used for the second fixed point operation. For example, given vector I, with entry $I(m_i)$ representing the weight of message $m_i$, and an adjacency matrix W with $W(m_i, m_j)$ being the weight of edge from message $m_i$ to message $m_j$, the power method may starts with an identity vector I. For example, $I(m_i)=1$ at the start of the power method. The power method may include multiply the identity vector by W, until there is no change in the entries of vector I up to some error margin. Thus, a fixed-point may be obtained by I=I_0*W*W*. . .*W after T iterations, where I_0 is the initial identity vector.

In some examples, initial weights I for the messages may be set based on the heaviness of the messages. The heaviness of each message may be calculated based on the weights of the terms each of the messages contains. In some examples, the heaviness may be calculated based on an initial message weight relative to the terms' importance weights it contains. For example, the initial weight or heaviness of each term may be calculated by summing over the I(w) weights for each term without normalization. Then, the vector corresponding to each message may be multiplied by a matrix representing inter message similarity. For example, the matrix may be calculated using Eqn. 5. Each of the messages may be multiplied by the matrix until a fixed point is reached. Thus, a message weight $I(m_i)$ for each of the messages may be obtained by iteratively multiplying the heaviness of each of the messages by the edge weight $w(m_i, m_j)$ of Eqn. 5 repeatedly until there is no change and thus a fixed point has been reached. For example, after each multiplication, $I(m\_i)=\Sigma\{k=1, \ldots, n\} I(m\_k) * w(m\_k, m\_i)$, where the message weight for a message gains from each message its own relative weights according to how similar that message is to m_i. The fixed point may be a state in which the values of the vector are unchanged by additional multiplication by the matrix. In other words, the fixed point may be a state of the vector at which convergence is reached. The messages may then be ranked in an order according to their respective weights $I(m_i)$.

In some examples, the ranked messages may be used to generate a weighted query. For example, a contextual multi-field search may be executed using the weighted query. In various examples, one or more messages may be filtered out based on the final message ranking. A query may then be generated based on the filtered messages. In some examples, a summarization of the dialog can be generated based on the final message ranking. For example, the summarization may include a predetermined of top ranked messages.

Figure 3A:
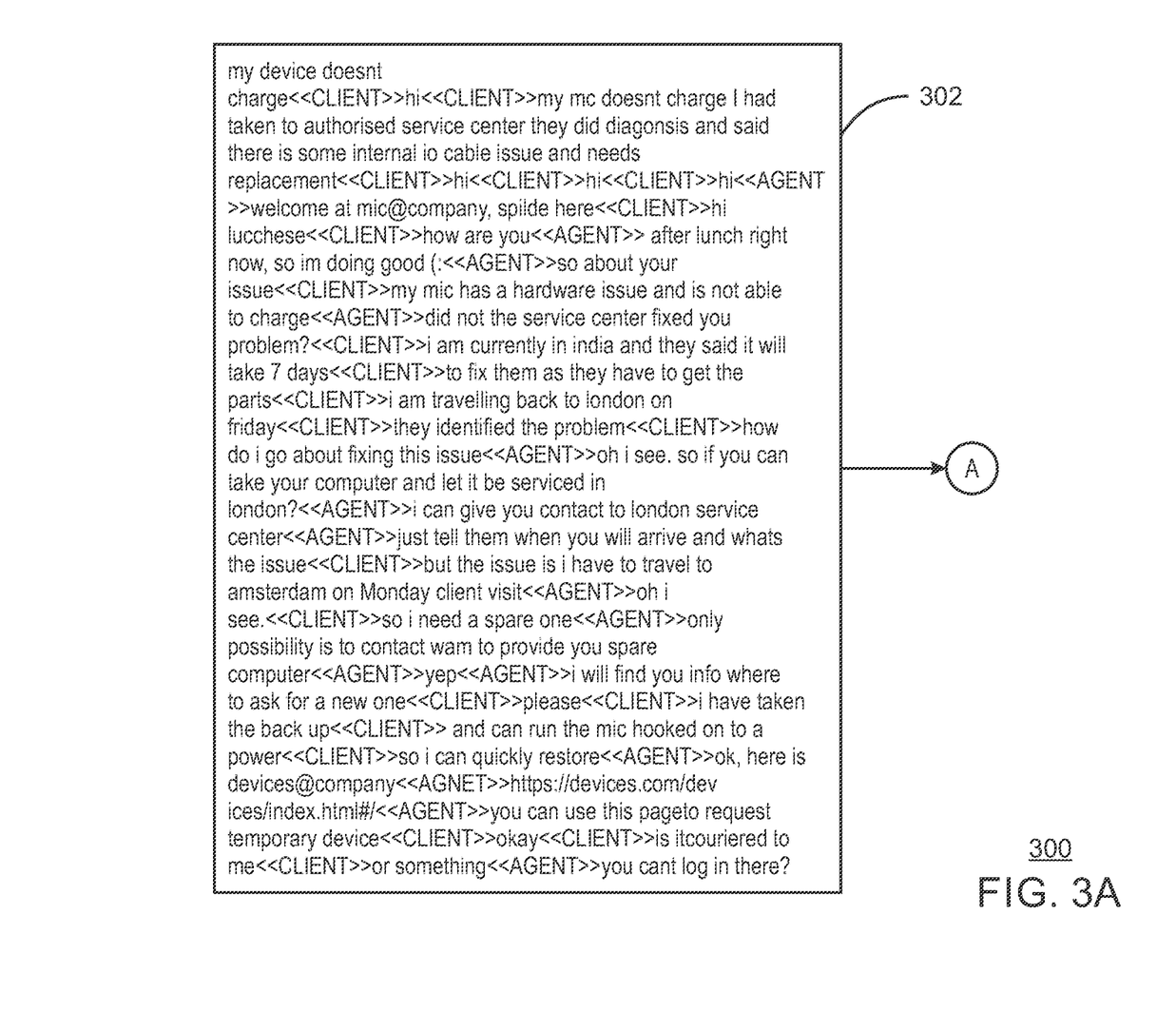
FIG. 3A illustrates an example dialog used to generate set of ranked messages.

FIG. 3A illustrates an example dialog used to generate set of ranked messages. The example generation 300 of ranked messages may be implemented using the example fixed point operation processes of FIGS. 1 and 2.

The example dialog 302 includes a number of messages between a client and an agent. In particular, the agent in the example dialog 302 is helping the client with a faulty microphone. The dialog begins with the client providing a summary of the issue. The agent then clarifies the issue and provides the client a webpage to receive a temporary device to use while traveling.

FIG. 3B illustrates an example generated set of ranked messages 304. In various examples, the ranked messages 304 may be generated using the fixed point operation processes of FIGS. 1 and 2, the method 400 of FIG. 4, the computing device 500 of FIG. 5, or the computer-readable medium 800 of FIG. 8. In particular, the result of the ranking using the techniques described herein may result in messages from the dialog identifying the problem are ranked highest, with the message resolving the problem ranked next highest, and with clarifying information following. As shown in FIG. 3B, irrelevant messages 306 are ranked lowest. For example, the irrelevant messages 306 include generic messages such as salutations and polite conversation about unimportant or uncontroversial matters that does not include information related to the main issue being resolved.

It is to be understood that the diagram of FIGS. 3A and 3B is not intended to indicate that the generation 300 is to include all of the components shown in FIGS. 3A and 3B. Rather, the generation 300 can include fewer or additional components not illustrated in FIGS. 3A and 3B (e.g., additional dialogs, messages, or additional speakers, etc.).

Figure 4:
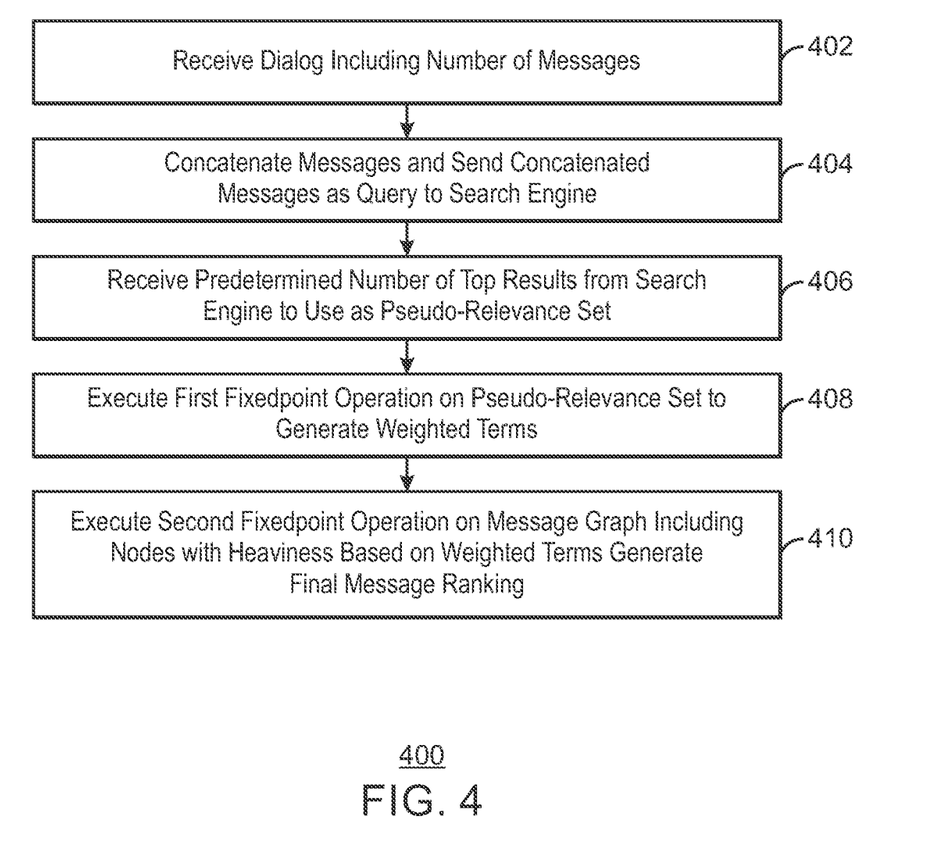
FIG. 4 is a block diagram of an example method for unsupervised ranking of messages in dialogs using fixed point operations.

FIG. 4 is a process flow diagram of an example method for unsupervised ranking of messages in dialogs using fixed point operations s. The method 400 can be implemented with any suitable computing device, such as the computing device 300 of FIG. 3 and is described with reference to the systems 100 and 200 of FIGS. 1 and 2. In various examples, the method described below can be implemented by the computing device 500 of FIG. 5. For example, the method 400 can be implemented via the processor 502 or the processor 802 of FIGS. 5 and 8.

At block 402, a dialog including a number of messages is received. For example, the dialog may include messages from two or more participants. In various examples, the participants may include users, agents, chatbots, etc.

At block 404, the messages are concatenated and the concatenated messages are sent as a query to a search engine. For example, the messages may be sent as a verbose query to the search engine.

At block 406, a predetermined number of top results to be used as a pseudo-relevance set are received from the search engine. For example, the predetermined number of top results can be used as topics.

At block 408, a first fixed point operation is executed on the pseudo-relevance set to generate weighted terms. In some examples, a keyword graph is generated based on the pseudo-relevance set. For example, the first fixed point operation is executed using the keyword graph. In various examples, each of the weighted terms are temporally biased based on an index of a last message in which each of the weighted terms appears.

At block 410, a second fixed point operation is executed on a message graph including nodes with a heaviness based on the weighted terms to generate a final message ranking. In some examples, weights are calculated for edges in the message graph based on a similarity between language model representations of nodes connected by the edges. In various examples, weights are calculated for edges in the message graph using a decay based on a relative position of the messages.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the method 400 may include generating a weighted query based on the final message ranking. Each message in the dialog may be treated as a sub-query with a weight. For example, the weighted query may be submitted to a search engine that accepts Boolean queries with weights. In some examples, the method 400 may include filtering out messages based on the final message ranking and generating a query based on the filtered messages. For example, a predetermined number of top ranked messages may be submitted in the query. In some examples, messages with an importance score above a threshold may be submitted in the query. In various examples, the method 400 may include summarizing the dialog based on the final message ranking. For example, the summary may include a number of top ranked messages or messages that have an importance score that exceeds a predetermined threshold.

In some scenarios, the techniques described herein may be implemented in a cloud computing environment. As discussed in more detail below in reference to at least FIGS. 5-8, a computing device configured to rank messages in dialogs using fixed point operations may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
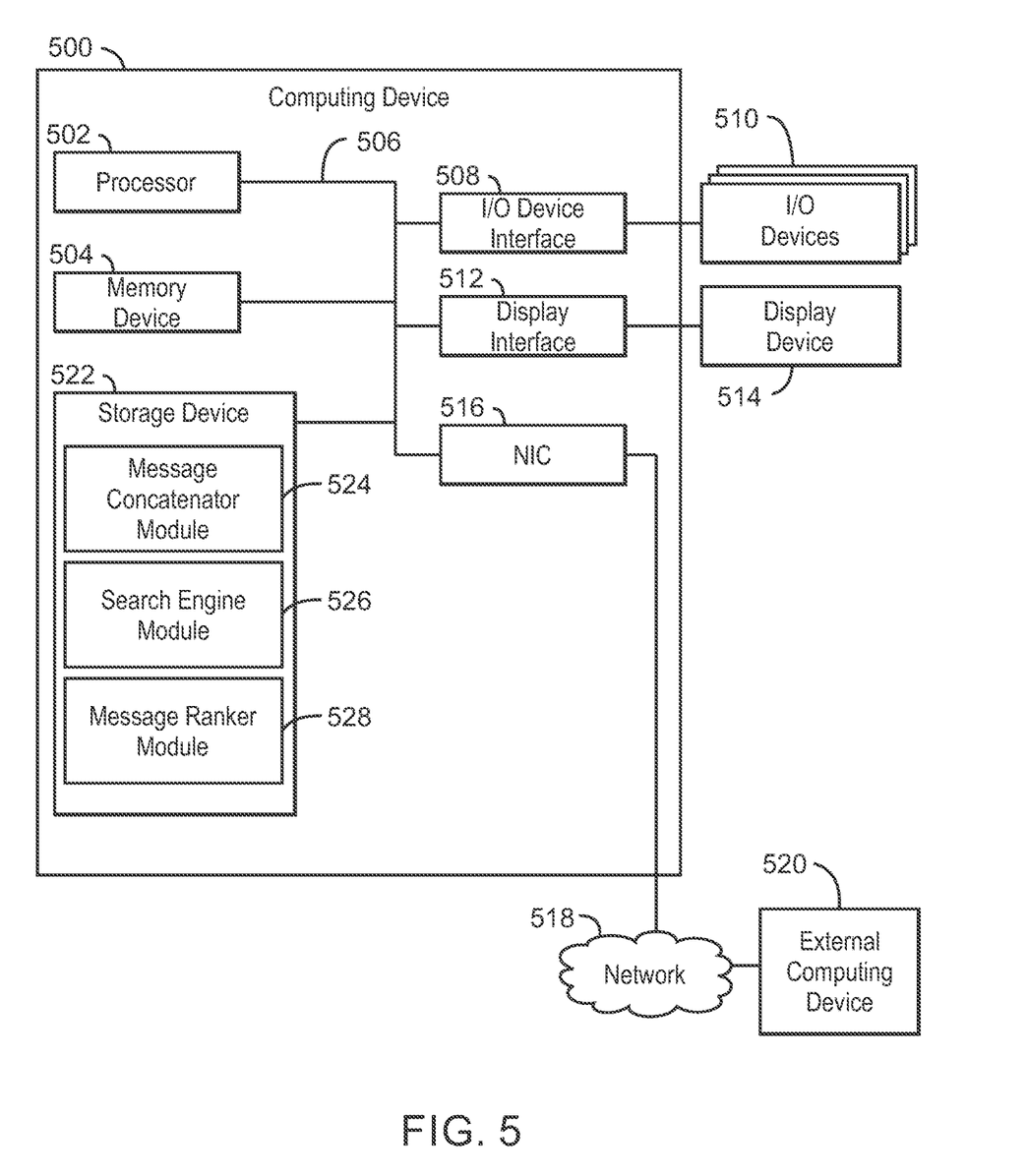
FIG. 5 is a block diagram of an example computing device that can rank messages in dialogs using fixed point operations.

FIG. 5 is block diagram of an example computing device that can rank messages in dialogs using fixed point operations. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a message concatenator module 524, a search engine module 526, and a message ranker module 528. The message concatenator module 524 can receive a pseudo-relevance set including top results from a search engine in response to transmitting a set of concatenated messages of a dialog. The search engine module 526 can generate the pseudo-relevance set based on the set of concatenated messages of a dialog. The message ranker module 528 can execute a first fixed point operation on the pseudo-relevance set to generate weighted terms. In some examples, the message ranker module 528 can temporally bias each of the weighted terms based on an index of a last message in which each of the weighted terms appears. The message ranker module 528 can then execute a second fixed point operation on a message graph including nodes with a heaviness based on the weighted terms to generate a final message ranking. For example, the message graph may include edges having weights calculated based on a similarity between language model representations of nodes connected by the edges. In various examples, the message ranker module 528 can calculate a heaviness for each of the nodes of the message graph based on the weighted terms that each of the nodes contains. In some examples, the similarity is to be calculated using a cosine similarity function. In various examples, the similarity is to be calculated using a cross entropy similarity function. In some examples, the weight of the edges is calculated using a decay based on a relative position of the messages.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the message concatenator 524, the search engine module 526, and the message ranker module 528 may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the message concatenator module 524, the search engine module 526, and the message ranker module 528 can be implemented with logic, wherein the logic, as referred to herein, can include any suitable hardware (e.g., a processor, among others), software (e.g., an application, among others), firmware, or any suitable combination of hardware, software, and firmware.

Figure 6:
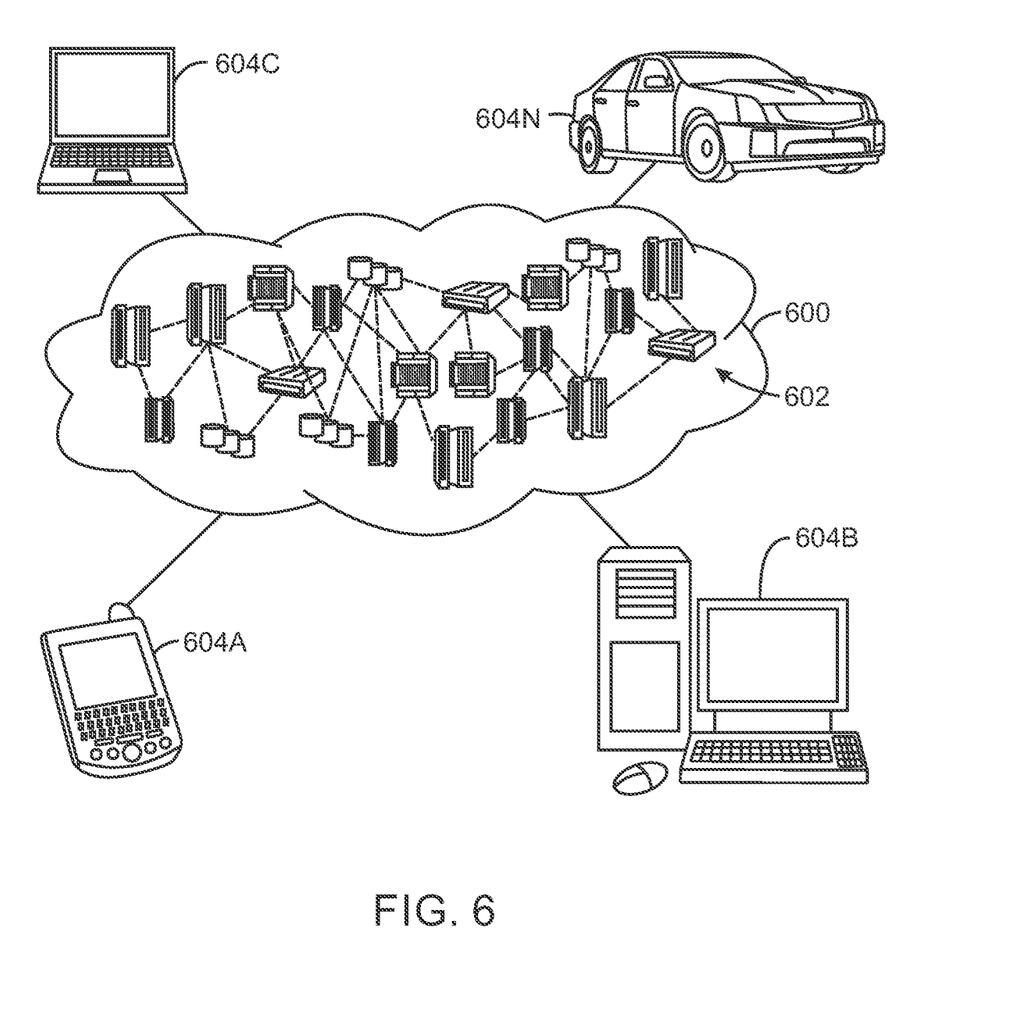
FIG. 6 is a diagram of an example cloud computing environment according to embodiments described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
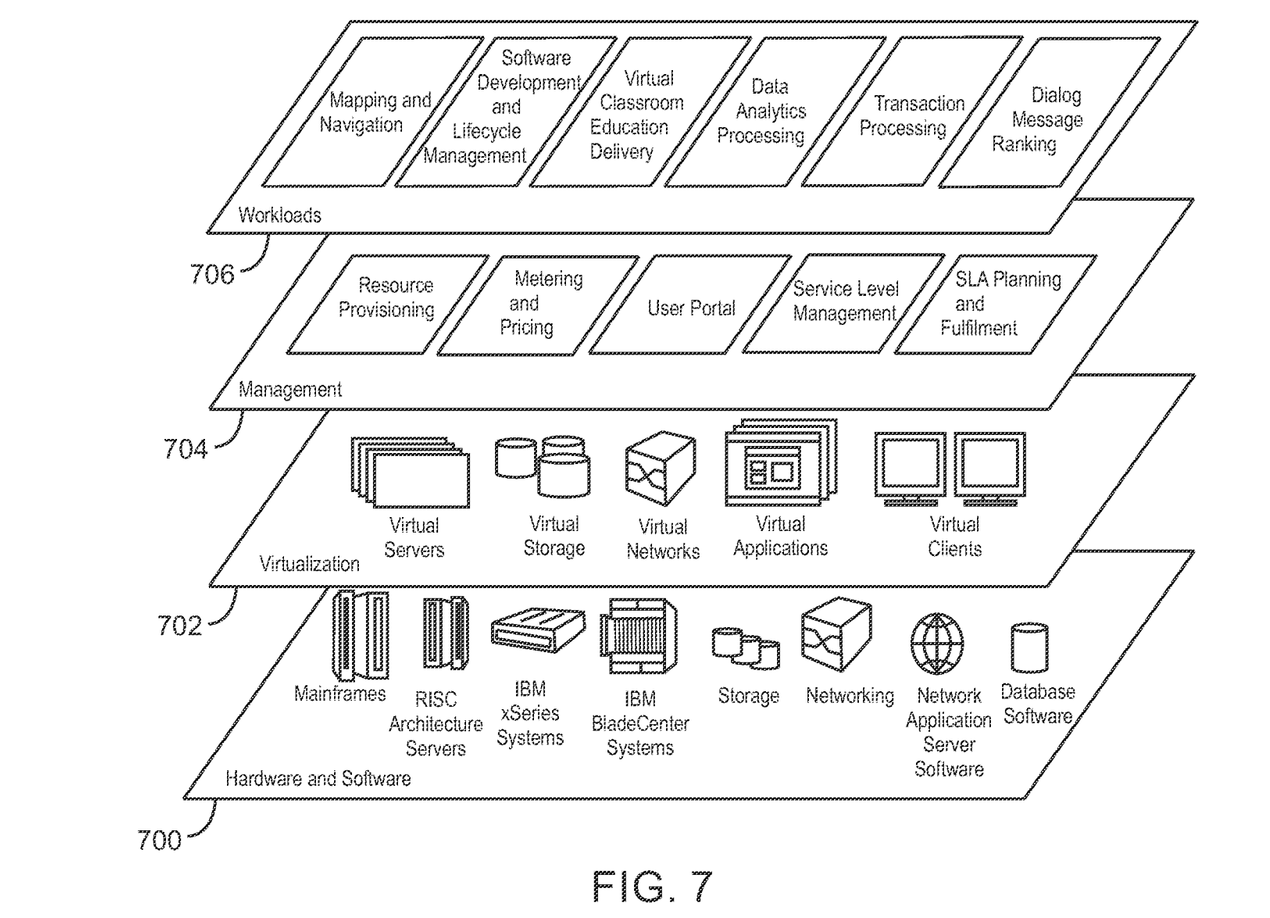
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and dialog message ranking.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
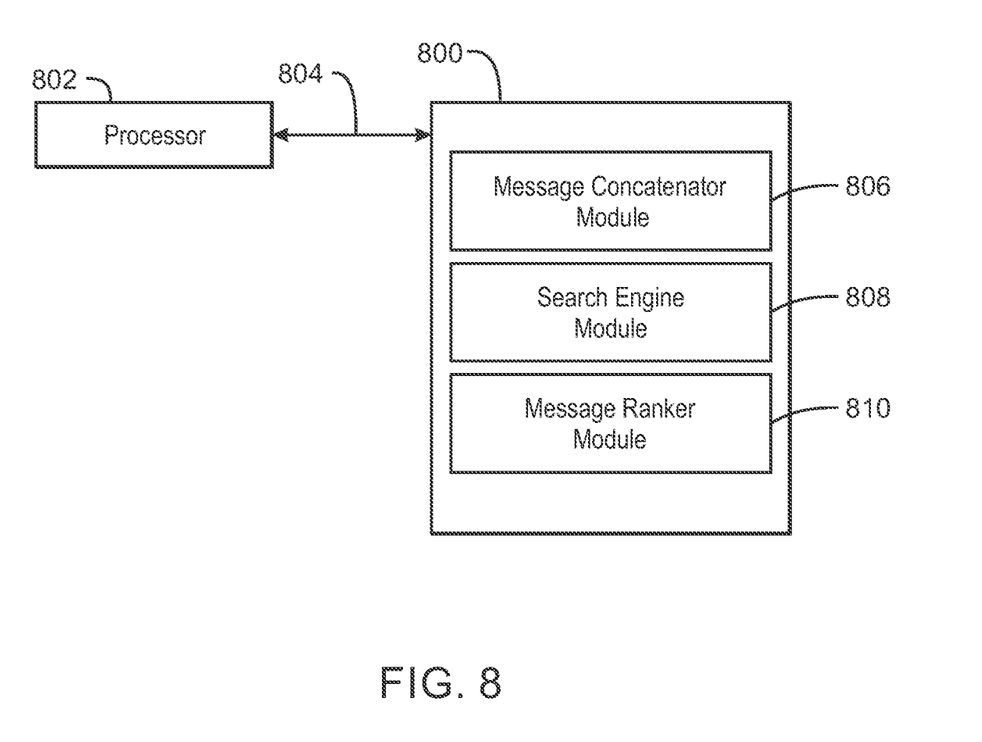
FIG. 8 is an example tangible, non-transitory computer-readable medium that can rank messages in dialogs using fixed point operations.

Referring now to FIG. 8, a block diagram is depicted of an example tangible, non-transitory computer-readable medium 800 that can rank messages in dialogs using fixed point operations. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the method 400 of FIG. 4.

The various software components discussed herein may be stored on the tangible, non-transitory, computer-readable medium 800, as indicated in FIG. 8. For example, a message concatenator 806 includes code to receive a dialog including a number of messages and concatenate the messages. The module 806 also includes code to send the concatenated messages to a search engine. A search engine module 808 includes code to generate a number of results based on the concatenated messages. The module 808 further includes code to select a number of top results from the results to use as a pseudo-relevance set. A message ranker module 810 includes code to execute a first fixed point operation on the pseudo-relevance set to generate weighted terms. In some examples, the message ranker module 810 includes code to generate a keyword graph based on the pseudo-relevance set. For example, the first fixed point operation may be executed using the keyword graph. In various examples, the message ranker module 810 includes code to temporally bias each of the weighted terms based on an index of a last message in which each of the weighted term appears. The message ranker module 810 also includes code to execute a second fixed point operation on a message graph including nodes with a heaviness based on the weighted terms to generate a final message ranking. In some examples, the message ranker module 810 also includes code to calculate weights for edges in the message graph based on a similarity between language model representations of nodes connected by the edges. In various examples, the message ranker module 810 also includes code to calculate weights for edges in the message graph using a decay based on a relative position of the messages. In some examples, the message ranker module 810 also includes code to generate a weighted query based on the final message ranking and performing a contextual multi-field search using the weighted query. In various examples, the message ranker module 810 also includes code to filter out messages based on the final message ranking and generate a query based on the filtered messages. It is to be understood that any number of additional software components not shown in FIG. 8 may be included within the tangible, non-transitory, computer-readable medium 800, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising a processor, a computer-readable storage media, and program instructions stored on the computer-readable storage media for causing the processor to:

receive a dialog comprising multiple messages generated from multiple computers and exchanged between the multiple computers, the exchanges occurring within a fixed time length corresponding to the dialog;

concatenating the received messages to form a verbose query;
transmit the verbose query to a first search engine;
receive a pseudo-relevance set comprising higher ranked results from the first search engine in response to the transmitting;
execute a first fixed point operation on the pseudo-relevance set to generate weighted terms, wherein the first fixed point operation comprises an iterative process in which a vector including scores associated with the weighted terms is processed until values of the vector remain stable within a range of error, wherein term weights of the weighted terms are temporally biased using a function that decays a weight of each query term of the verbose query based on an index of the last message of the dialog in which a respective query term appears, wherein the index temporally orders the set of concatenated messages, and wherein the term weights are further determined based on frequency of the respective query term within the dialog;
generate a final message ranking by executing a second fixed point operation on a message graph comprising nodes representing messages of the dialog with a heaviness based on the weighted terms and edges connecting the nodes, the edges including weights indicating a similarity between connected messages of the dialog;
generate a weighted query based on the final message ranking, wherein each message in the dialog is treated as a sub-query with a weight in the weighted query, wherein the processor filters out messages from the set of concatenated message of the dialog based on the final message ranking to generate a set of filtered messages and to generate the weighted query based on the set of filtered messages;
transmit the weighted query to a second search engine, wherein the second search engine executes a contextual multi-field search using the weighted query as an input query into the contextual multi-field search; and
receive and present search results generated by the weighted query being the input query in the contextual multi-field search of the second search engine.

2. The system of claim 1, wherein the weights of the edges of the message graph are calculated based on a similarity between language model representations of the nodes.

3. The system of claim 2, wherein the similarity is calculated using a cosine similarity function or a cross entropy similarity function.

4. The system of claim 2, wherein the weight of the edges is calculated using a decay based on a relative position of the messages.

5. The system of claim 1, wherein the program instructions further cause the processor to calculate the heaviness for each of the nodes of the message graph based on the weighted terms that each of the nodes contains.

6. The system of claim 1, wherein the messages are unlabeled.

7. The system of claim 1, wherein the program instructions further cause the processor to generate a summarization of the dialog based on the final message ranking.

8. A computer-implemented method, comprising:
receiving, via a processor, a dialog comprising a plurality of messages generated from multiple computers and exchanged between the multiple computers, the exchanges occurring within a fixed time length corresponding to the dialog;
concatenating, via the processor, the messages to form a verbose query;
sending the verbose query to a first search engine;
receiving, via the processor, a pseudo-relevance set comprising higher ranked results from the first search engine in response to the sending;
executing, via the processor, a first fixed point operation on the pseudo-relevance set to generate weighted terms, wherein the first fixed point operation comprises an iterative process in which a vector including scores associated with the weighted terms is processed until values of the vector remain stable within a range of error, wherein term weights of the weighted terms are temporally biased using a function that decays a weight of each query term of the verbose query based on an index of the last message of the dialog in which a respective query term appears, wherein the index temporally orders the set of concatenated messages, and wherein the term weights are further determined based on frequency of the respective query term within the dialog;
generating, via the processor, a final message ranking by executing a second fixed point operation on a message graph comprising nodes representing messages of the dialog with a heaviness based on the weighted terms and edges connecting the nodes, the edges including weights indicating a similarity between connected messages of the dialog;
generating, via the processor, a weighted query based on the final message ranking, wherein each message in the dialog is treated as a sub-query with a weight in the weighted query, wherein the generating the weighted query comprises filtering out messages from the set of concatenated message of the dialog based on the final message ranking to generate a set of filtered messages and generating the weighted query based on the set of filtered messages;
transmitting, via the processor, the weighted query to a second search engine;
performing a contextual multi-field search at the second search engine using the weighted query as an input query into the contextual multi-field search;
receiving and presenting, via the processor, search results generated by the contextual multi-field search.

9. The computer-implemented method of claim 8, wherein the weights for the edges in the message graph are calculated based on a similarity between language model representations of the nodes.

10. The computer-implemented method of claim 8, wherein the weights for the edges in the message graph are calculated using a decay based on a relative position of the messages.

11. The computer-implemented method of claim 8, further comprising generating a summarization of the dialog based on the final message ranking.

12. The computer-implemented method of claim 9, wherein the similarity is calculated using a cosine similarity function or a cross entropy similarity function.

13. The computer-implemented method of claim 8, wherein the messages are unlabeled.

14. A computer program product comprising a computer-readable storage medium having program code embodied therewith, the program code executable by a processor to cause the processor to:
receive a dialog comprising a plurality of messages generated from multiple computers and exchanged between the multiple computers, the exchanges occurring within a fixed time length corresponding to the dialog;

concatenate the messages to form a verbose query;

send the verbose query to a first search engine;

receive a pseudo-relevance set comprising higher ranked results from the first search engine in response to the sending;

execute a first fixed point operation on the pseudo-relevance set to generate weighted terms, wherein the first fixed point operation comprises an iterative process in which a vector including scores associated with the weighted terms is processed until values of the vector remain stable within a range of error, wherein term weights of the weighted terms are temporally biased using a function that decays a weight of each query term of the verbose query based on an index of the last message of the dialog in which a respective query term appears, wherein the index temporally orders the set of concatenated messages, and wherein the term weights are further determined based on frequency of the respective query term within the dialog;

generate a final message ranking by executing a second fixed point operation on a message graph comprising nodes representing messages of the dialog with a heaviness based on the weighted terms and edges connecting the nodes, the edges including weights indicating a similarity between connected messages of the dialog;

generate a weighted query based on the final message ranking, wherein each message in the dialog is treated as a sub-query with a weight in the weighted query, wherein the generating the weighted query comprises filtering out messages from the set of concatenated message of the dialog based on the final message ranking to generate a set of filtered messages and generating the weighted query based on the set of filtered messages;

transmit the weighted query to a second search engine;

perform a contextual multi-field search at the second search engine using the weighted query comprising weighted filtered messages as an input query into the contextual multi-field search; and receiving and presenting search results generated by the contextual multi-field search.

15. The computer program product of claim 14, wherein the weights for the edges in the message graph are calculated based on a similarity between language model representations of the nodes.

16. The computer program product of claim 14, wherein the weights for the edges in the message graph are calculated using a decay based on a relative position of the messages.

17. The computer program product of claim 14, wherein the program instructions further cause the processor to generate a summarization of the dialog based on the final message ranking.

18. The computer program product of claim 15, wherein the similarity is calculated using a cosine similarity function or a cross entropy similarity function.

19. The computer program product of claim 14, wherein the messages are unlabeled.

20. The computer program product of claim 14, wherein the program instructions further cause the processor to calculate the heaviness for each of the nodes of the message graph based on the weighted terms that each of the nodes contains.

* * * * *